United States Patent [19]

Boudot et al.

[11] Patent Number: 4,661,335

[45] Date of Patent: Apr. 28, 1987

[54] NOVEL SILICON POWDER HAVING HIGH PURITY AND DENSITY AND METHOD OF MAKING SAME

[75] Inventors: Bernard Boudot; Philippe Nataf, both of Paris, France

[73] Assignee: Rhone-Poulenc Specialites Chimiques, Courbevoie, France

[21] Appl. No.: 798,720

[22] Filed: Nov. 18, 1985

Related U.S. Application Data

[63] Continuation of Ser. No. 516,845, Jul. 25, 1983, abandoned.

[30] Foreign Application Priority Data

Jul. 26, 1982 [FR] France ............................. 82 12968

[51] Int. Cl.$^4$ ............................................. C01B 33/02
[52] U.S. Cl. ...................................... 423/348; 423/349
[58] Field of Search ........................ 423/348, 349, 350

[56] References Cited

U.S. PATENT DOCUMENTS 4,314,525 2/1982 Hsu et al. ............................. 423/349

FOREIGN PATENT DOCUMENTS 1417138 9/1970 Fed. Rep. of Germany ...... 423/349
160829 11/1964 U.S.S.R. ............................. 423/349

OTHER PUBLICATIONS

Iya, S. K. et al; "Heterogeneous Decomposition of Silane in a Fixed Bed Reactor", *J. Electr. Chem. Soc.*, vol. 129, pp. 1531–1535 (7/82).

*Primary Examiner*—Christopher W. Brody
*Attorney, Agent, or Firm*—Burns, Doane, Swecker & Mathis

[57] ABSTRACT

A powder of elemental silicon having high purity and a density in excess of about 0.6 g/cm$^3$, preferably ranging from 0.8 to 1.2 g/cm$^3$, and which is non-amorphous as determined by X-ray analysis, is facilely prepared by thermally decomposing a silane feedstream at a decomposition reaction temperature ranging from 500° to 700° C., preferably from 500° to 600° C.

10 Claims, 2 Drawing Figures

NOVEL SILICON POWDER HAVING HIGH PURITY AND DENSITY AND METHOD OF MAKING SAME

This application is a continuation, of application Ser. No. 516,845, filed July 25, 1983 now abandoned.

BACKGROUND OF THE INVENTION

1. Field of the Invention

The present invention relates to a novel, highly pure and dense silicon powder, and to a process for the preparation therof.

2. Description of the Prior Art:

It is known to this art to prepare high grade silicon (or silicon which is adapted for the production of semiconductors therefrom) by decomposing silane, $SiH_4$, at elevated temperatures. ' Such decomposition process has been carried out at especially high temperatures, i.e., at temperatures exceeding about 700° C. Consistent therewith, a finely divided powder of pure silicon is obtained, but having an extremely low density, i.e., on the order of 0.2 (The Conference Record of the Fifteenth IEEE photovoltaic specialists conference, May 12-15, 1981, pages 565-568). Furthermore, it too was known to this art, from *Chemical Abstracts*, 96, No. 20, page 135, 164, 975e (1982), to prepare amorphous silicon, the particle sizes thereof ranging from 0.1 to 1 micron, by decomposing silane in a fluidized bed comprised of silicon particulates.

By the term "density" as utilized herein, there is intended "apparent density" following recovery determined according to the applicable standards for determining such apparent density.

SUMMARY OF THE INVENTION

Accordingly, a major object of the present invention is the provision of an improved process for the thermal decomposition of silane into pure silicon, and features conducting such thermal decomposition at the moderate temperatures of 500° to 700° C., preferably at 500° to 600° C., to obtain a non-amorphous silicon powder, as determined by X-ray diffraction, and such powder having a high density of at least about 0.6, $g/cm^3$ advantageously ranging from 0.6 to 0.8 $g/cm^3$.

DETAILED DESCRIPTION OF THE INVENTION

More particularly according to this invention, the highly pure silicon powder hereby provided is characterized as non-amorphous, by X-ray diffraction pattern, and has a density of greater than 0.6g/$cm^3$.

The process for the preparation thereof entails the thermal decomposition of silane, at temperatures ranging from about 500° to 700° C., and preferably ranging from 500° to 600° C. Preferably, such thermal decomposition is carried out on a gaseous feedstream of pure silane.

It too has been found that the density of the product powder is increased, not only if the thermal decomposition of the silane is carried out within that range of temperatures above indicated, but also if said thermal decomposition is carried out such that the gaseous phase in the decomposition reaction zone uniformly and homogeneously comprises at least 15% by volume of unreacted silane. Indeed, it has also been found under such conditions that the silane decomposition takes place, at least in part, upon "seed" particles of the silicon powder already formed and that such particles will be incresed in size because of the gradual deposition of silicon on the outer surfaces thereof. Thus, facilely prepared is a silicon powder having a density advantageously ranging from 0.8 to 1.2 $g/cm^3$.

Hence, featured hereby is a novel composition of matter comprising high purity, high grade silicon powder which is evidenced to be non-amorphous by X-ray diffraction pattern, and which has a density ranging from 0.8 to 1.2 $g/cm^3$ if the process entails maintaining within the gaseous phase in the decomposition reaction zone a uniform and homogeneous composition comprising at least 15% by volume of unreacted silane.

To carry out the at least 15% by volume of silane embodiment of the invention, many different and varied techniques can be employed. For example, a tubular reactor can be used, with the silane being fed to one end thereof and being appropriately heated along at least a portion of its length. The length of the heated area is selected such that no more than 85% by volume of the feedstock silane is decomposed within said heated zone.

Figure 1:
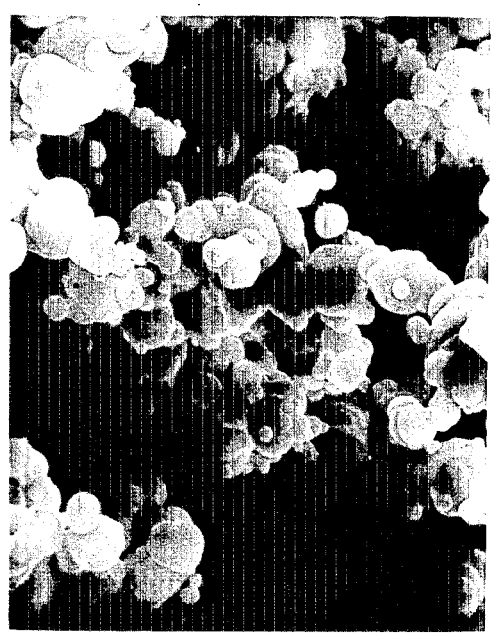
FIG. 1 and FIG. 2 are scanning election microscope photomicrographs of the silicon powder prepared according to the invention, at magnifications of 3000X and 6000X.
Figure 2:
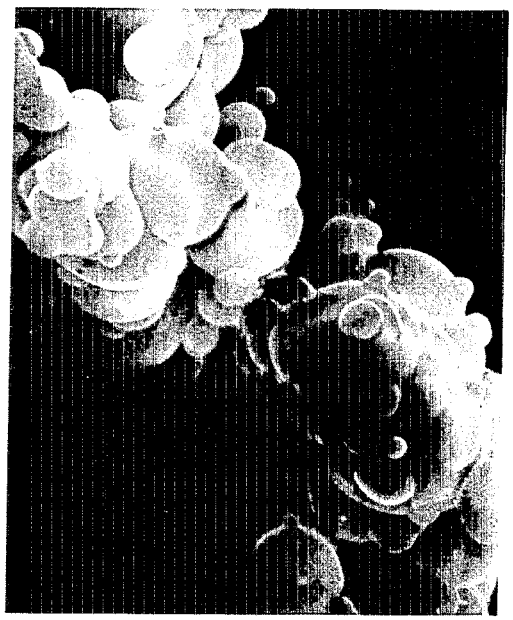

The silicon powder according to the invention is non-amorphous as determined by X-ray analysis spectrum. In particular, it is a powder wherein a majority of the silicon is in polycrystalline form. Furthermore, the specific surface area of the novel powder typically ranges from 1 to 2 $m^2/g$. Moreover, the powder is comprised of spherical particles or of silicon particles having an average diameter of from about 2 to 5 microns and ultimately agglomerated into aggregates of about 50 microns, as is shown in the accompanying Figures of Drawing, i.e., the scanning electron microscope photomicrographs of FIGS. 1 and 2.

In order to further illustrate the present invention and the advantages thereof, the following specific examples are given, it being understood that same are intended only as illustrative and in nowise limitative.

EXAMPLE 1

A stainless steel tubular reactor was used, which was enveloped within an outer sheath of quartz. The length of the reactor was 900 mm, its diameter was 100 mm, and it was heated by means of a tubular resistance furnace along about 355 mm thereof. Pure silane was injected into one end of the reactor, with unreacted gas and the product silicon powder being recovered at the other end thereof.

In the following Table are reported the conditions and results of this experiment, including:

(i) The rate of feed of the silane (measured under normal conditions), in $cm^3$/ min;

(ii) The temperature of the furnace (T);

(iii) The amount of unconverted silane which remains in the reactor outlet gases; and (iv) The density of the silicon powder thus prepared.

TABLE

| SILANE FEED ($cm^3$/min) | T (°C.) | UNREACTED SILANE (%) | DENSITY OF SILICON g/$cm^3$ |
|---|---|---|---|
| 600 | 750 | 5 | 0.3 |

TABLE-continued

| SILANE FEED (cm³/min) | T (°C.) | UNREACTED SILANE (%) | DENSITY OF SILICON g/cm³ |
| --- | --- | --- | --- |
| 600 | 550 | 21 | 0.75 |
| 1000 | 550 | 29 | 1 |
| 1000 | 490 | 55 | 0.4 |

EXAMPLE 2

A stainless steel tubular reactor was used. The heated length of the reactor was 1200 mm; its diameter was 430 mm. Pure silane was injected into one end of the reactor, with unreacted gas and the product silicon powder being recovered at the other end thereof.

The following were the conditions and results of such experiment:

(i) Feed rate of silane (measured under normal circumstances): 4085 cm³/min;

(ii) Furnace temperature: 550° C.;

(iii) Amount of unreacted silane present in the reactor effluent: 35%; and (iv) Density of product silicon powder: 0.80g/cm³.

EXAMPLE 3

A quartz tubular reactor was used. The heated length of the reactor was 1200 mm; its diameter was 430 mm. Pure silane was injected into one end of the reactor, with unreacted gas and the product silicon powder being recovered at the other end thereof.

The following were the conditions and results of such experiment:

(i) Feed rate of silane (measured under normal circumstances): 4085 cm³/min;

(ii) Furnace temperature: 600° C.;

(iii) Amount of unreacted silane present in the reactor effluent: 30%; and (iv) Density of product silicon powder: 0.70 g/cm³.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A high purity silicon powder which is non-amorphous as determined by X-ray diffraction analysis, said powder having a density in excess of about 0.6 g/cm³.

2. The silicon powder as defined by claim 1, wherein a majority of the silicon is polycrystalline, and the specific surface area thereof ranges from 1 to 2 m2/g.

3. The silicon powder as defined by claim 1, comprising essentially spherical silicon particulates.

4. The silicon powder as defined by claim 1, comprising silicon particulates having an average diameter ranging from about 2 to 5 microns.

5. The silicon powder as defined by claim 4, comprising aggregates of about 50 microns.

6. The silicon powder as defined by claim 1, having a density ranging from 0.8 to 1.2 g/cm³.

7. A process for the preparation of a high purity silicon powder which is non-amorphous as determined by x-ray diffraction analysis, said powder having a density in excess of about 0.6g/cm³, comprising thermally decomposing a silane feedstream at a decomposition reaction temperature ranging from 500° to 700° C., said thermal decomposition being carried out in a decomposition zone which comprises a gaseous feedstream, said gaseous feedstream uniformly and homogeneously comprising at least 15% by volume of unreacted silane.

8. The process as defined by claim 7, said decomposition reaction temperature ranging from 500° to 600° C.

9. The process as defined by claim 7 wherein said powder is produced from a starting material consiting of a stream of pure silane.

10. The process as defined by claim 7 wherein said powder is produced by thermally decomposing a silane feedstream without an inital presence of silicon.

* * * * *